Feb. 1, 1955 H. J. REYNOLDS 2,700,848
FLOWER DISPLAY DEVICE

Filed Nov. 30, 1950 2 Sheets-Sheet 1

INVENTOR
HENRY J. REYNOLDS

BY *Semmes, Keegin, Robinson & Semmes*
ATTORNEYS

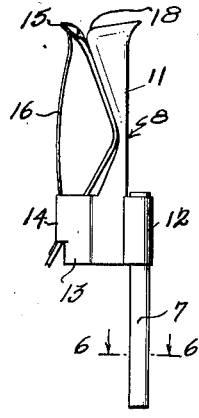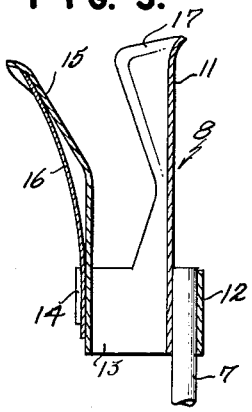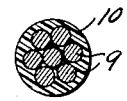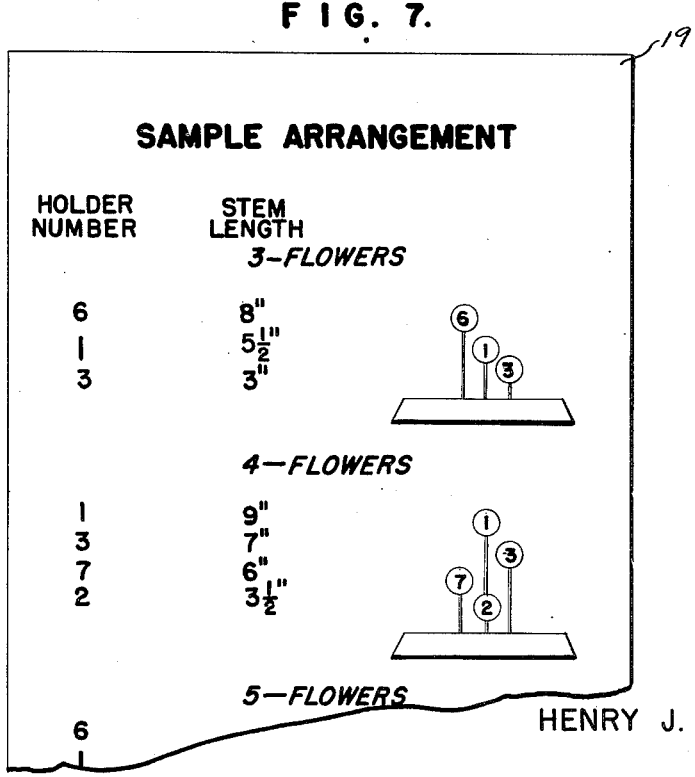

United States Patent Office

2,700,848
Patented Feb. 1, 1955

2,700,848

FLOWER DISPLAY DEVICE

Henry J. Reynolds, Sumner, Wash.

Application November 30, 1950, Serial No. 198,463

3 Claims. (Cl. 47—41)

This invention relates to a device for the display of flowers, and more especially to a device of the type described which is especially designed for the use of novices in the effective display of flowers.

One of the objects of this invention is to provide a device for the display of flowers in effective arrangements.

Another object of the present invention is to provide a device of the type described which is especially designed for use in combination with instructions for the effective display of flowers.

A further object of the present invention is to provide a device of the type described provided with flower holders of a highly advantageous structure for the support and display of flowers.

A structure embodying the present invention is shown in the drawings, it being understood that various changes can be made by those skilled in the art without departing from the spirit of the invention.

In general, the invention consists of a display device for flowers comprising a base provided with a plurality of sockets, each of which is identified by indicia, a flower holder for each socket, and instructions for the effective arrangement of flowers. The various arrangements described in the instructions are explained by indicia which refer to the indicia identifying the sockets.

The advantages of such a combination are obvious because the display device and particularly the holders for the flowers are especially suitable for the arrangement and display of flowers, and the instructions can be prepared by an expert in this art. This permits a totally inexperienced person to readily prepare extremely effective displays of flowers by following the instructions.

In the drawings:

Figure 4 is a side elevational view of one of the expansible flower holders;

Figure 5 is a side elevational view, partly in section, of expansible flower holder shown in Figure 4;

Figure 6 is a view taken along the lines 6—6 of Figure 4; and

Figure 7 is a fragmental view of the set of instructions.

Figure 1:
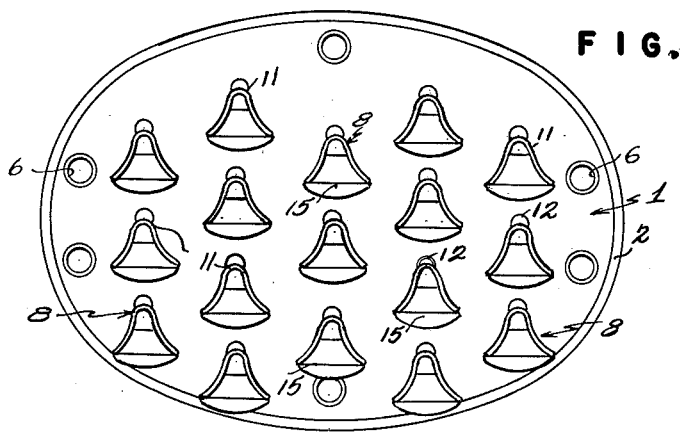
Figure 1 is a top plan view of the flower display device.
Figure 2:
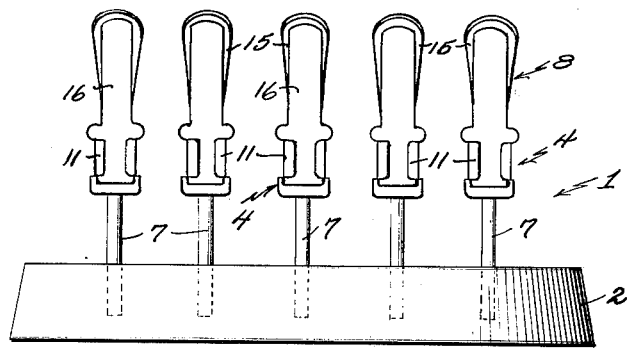
Figure 2 is a side elevational view of the flower display device shown in Figure 1.
Figure 3:
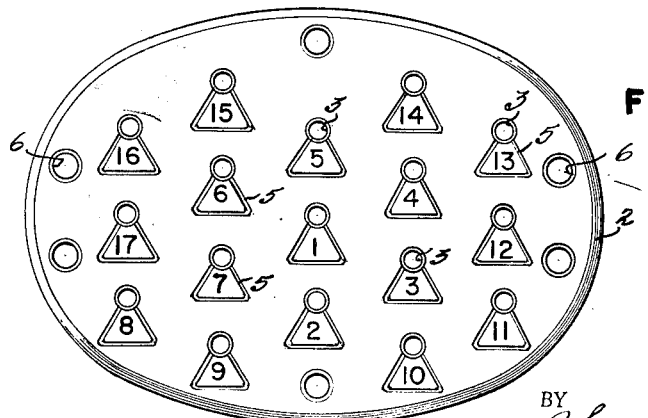
Figure 3 is a top plan view of the flower display device with the flower holders removed in order to show the plurality of sockets in the base with identifying indicia.

As best shown in Figures 2 and 3, the flower display device generally designated by the numeral 1 comprises a base 2 having a plurality of sockets 3, each of which is adapted to receive a flower holder generally designated by the numeral 4. Each of the sockets 3 are provided with identifying indicia such as the numbers shown in the drawings. These indicia may be printed or engraved directly into the surface of the base if desired and can be set off by lines forming enclosures 5. The base 2 may also be provided with a plurality of apertures 6 in which greens or other decorations can be placed. The base is designed to be placed in a bowl or other suitable receptacle.

The flower holders 4 comprise a support 7 for an expansible, cup-shaped holder generally designated by the numeral 8. Preferably, this stem should be semi-flexible in order that the support can be bent to any desired angle which will increase the effectiveness of the display. As shown in Figure 6, the support 7 may consist of a plurality of individual wires 9 enclosed by a semi-flexible covering 10.

As best shown in Figures 4 and 5, the expansible, cup-shaped portion 8 of the holder 4 comprises a pair of jaw members designed to receive one or more flower stems. In the structure shown in the drawings, one of the jaws is a curved shield-like member 11, one portion of the base of which is curved to form a collar 12 which secures the shield 11 to the top of the support 7. The remainder of the shield 11 is stamped out as a pair of flange-like members 13, the ends of both of which are bent to form opposed tabs 14. The remaining jaw of the cup-like holder 8 is in the shape of a tongue 15, the face of which is opposed to the concave surface of the shield 11. A spring member 16 is also provided and is adapted to urge the tongue 15 against the opposed face of the shield 11. The lower ends of the tongue 15 and the spring 16 are held in position by the tabs 14.

Although the tongue 15 is urged toward the curved face of the shield 11, it is arrested by wings 17. For this reason, an expansible, cup-shaped portion 18 remains between the jaws. This portion is adapted to receive one or more flower stems. It can be enlarged by overcoming the tension on the spring 16.

Instructions 19 are shown in Figure 7. These instructions may be in the form of a chart or book or the like. The arrangement of the flowers in each display is explained by numbers which refer to the corresponding numbers identifying the sockets 3 on the base 2. If desired, the instructions can show an illustration of the device 1 with numerals on the illustrated flower holders 4 to indicate the sockets in which the flowers should be placed. The proper length of the stems of the flowers should also be given and instructions concerning the type of flowers suitable for specific arrangements and the proper preparation of flowers and the use of greens and other decorative effects. If desired, the angles to which the stems 7 should be bent can be illustrated or this can be left as a matter of personal judgment. The use to which sample arrangements of flowers should be put can also be explained.

In view of the foregoing, it is believed obvious that in this way an amateur by following the written instructions of a professional can readily prepare a professional display of flowers without possibility of error. This will prove useful not only in the home but in business establishments requiring such displays.

I claim:

1. A flower holder comprising a curved shield having wing members, a tongue positioned in opposed relation to the curved face of the shield, spring means on said holder engaging and pressing the tongue toward the wings of the shield to form a cup in conjunction with the curved face of the shield, said cup being adapted to receive the stem of a flower, and a semi-flexible support secured to said cup.

2. A flower holder comprising a curved shield having wing members, a tongue positioned in opposed relation to the curved face of the shield, spring means on said holder engaging and pressing the tongue toward the wings of the shield to form a cup in conjunction with the curved face of the shield, said cup being adapted to receive the stem of a flower, and a plurality of wires enclosed by a casing and secured to and constituting a semi-flexible support for the cup.

3. In a flower holder for flower display systems, a stem holder comprising a bifurcated element having opposed cup-shaped portions, one such portion being channeled, a spring on said holder engaging and pressing the other portion toward the channeled portion, a recessed flange on said holder for holding said spring, and a flexible support for said bifurcated element secured thereto and to said holder.

References Cited in the file of this patent

UNITED STATES PATENTS

| 606,098 | Steifel | June 21, 1898 |
| 1,845,154 | Jewett | Feb. 16, 1932 |
| 2,046,854 | Simpson | July 7, 1936 |
| 2,413,307 | Gifford | Dec. 31, 1946 |
| 2,545,383 | Regan | Mar. 13, 1951 |

FOREIGN PATENTS

| 22,224 | Great Britain | A. D. 1909 |